(12) United States Patent
D'Amora et al.

(10) Patent No.: US 7,388,588 B2
(45) Date of Patent: Jun. 17, 2008

(54) PROGRAMMABLE GRAPHICS PROCESSING ENGINE

(75) Inventors: Bruce David D'Amora, New Milford, CT (US); Thomas Winters Fox, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 10/937,174

(22) Filed: Sep. 9, 2004

(65) Prior Publication Data
US 2006/0050077 A1    Mar. 9, 2006

(51) Int. Cl.
G06F 15/16 (2006.01)
G06F 12/02 (2006.01)
G06F 12/00 (2006.01)
G06F 13/00 (2006.01)
G06F 13/28 (2006.01)

(52) U.S. Cl. .............. 345/567; 345/503; 345/567; 711/144

(58) Field of Classification Search ............... 345/503, 345/567; 395/163; 711/144
See application file for complete search history.

(56) References Cited

U.S. PATENT DOCUMENTS 5,289,577 A * 2/1994 Gonzales et al. ........... 345/506
5,388,206 A * 2/1995 Poulton et al. ............. 345/505
5,745,125 A * 4/1998 Deering et al. ............. 345/503
5,943,684 A * 8/1999 Arimilli et al. ............. 711/144
6,384,833 B1 * 5/2002 Denneau et al. ........... 345/522
6,564,302 B1 * 5/2003 Yagi et al. .................. 711/144

OTHER PUBLICATIONS

M. Kameyama, et al., 3D Graphics LSI Core for Mobile Phone "Z3D", Mitsubishi Electric Corp., pp. 1-36, http://www.ibiblio.org/hwws/previous/www_2003/presentations/Kameyama.pdf.
M. Kameyama, et al., 3D Graphics LSI Core for Mobile Phone "Z3D", The Eurographics Association 2003, pp. 60-67, http://portal.acm.org/citation.cfm?id=844184.

* cited by examiner

Primary Examiner—Xiao M. Wu
Assistant Examiner—Aaron M Guertin
(74) Attorney, Agent, or Firm—Duke W. Yee; Mark Wardas; Gerald H. Glanzman

(57) ABSTRACT

A fully programmable graphics processing engine is provided. The graphics processing engine includes three independent, programmable processors that run independent sets of instructions from independent instruction storage facilities. Graphics processing tasks may be distributed among the serially pipelined processors to allow for load balancing and parallel processing. The graphics processing engine may be a graphics co-processing core within a larger, general purpose computing system. Register files and storage units may be addressable by the system host processor. Each processor accepts incoming data for state or context updates. Each processor may execute a specific graphics processing function by executing a set of instructions when a predetermined memory address is accessed.

22 Claims, 14 Drawing Sheets

PROGRAMMABLE GRAPHICS PROCESSING ENGINE

BACKGROUND OF THE INVENTION

1. Technical Field

The present invention relates to data processing and, in particular, to three-dimensional graphics processing. Still more particularly, the present invention provides a fully programmable three-dimensional graphics engine.

2. Description of Related Art

Three dimensional (3-D) graphics is the creation, display, and manipulation of objects in a computer in three dimensions. 3-D graphics programs allow objects to be represented with width, height, and depth. As 3-D entities, objects may be moved, scaled, rotated and viewed from all angles. 3-D graphics may also allow lighting, texture mapping, and shading to be applied automatically in the rendering stage. 3-D graphics may be implemented using hardware or software or a combination of both.

A graphics accelerator is a high-performance display adapter that provides graphics functions in hardware. When functions are executed on the graphics adapter, the host processor is relieved of much of the processing to render the images on screen. Many display adapters include some acceleration. For 3-D graphics, the operations may include texture mapping, Gouraud shading, and the like.

Many current graphics accelerators use fixed function macros that implement the various graphics vertex and pixel processing tasks in non-programmable, specific logic. Other solutions use both programmable elements and fixed function elements whereby some graphics tasks are implemented in programmable processors while others are relegated to non-programmable, specific hardware logic macros. Currently, the programmable solutions are limited by instruction set size, memory constraints, and the capability of increasing the working set of data elements beyond the size of the intial input data set.

One drawback to the fixed function approach is a lack of flexibility. Fixed function solutions, which can achieve high performance, fail to accommodate new requirements as the graphics Application Programming Interfaces (APIs) evolve. Thus, there is a desire for programmability within the 3-D graphics pipeline, as seen with the industry trend toward "vertex shaders" and "pixel shaders," existing across the spectrum of graphics offerings available today. These systems must often be redesigned to incorporate new graphics features.

Generally, 3-D graphics accelerators include specific hardware that is costly, consume a large amount of power, and generate a great deal of heat. On the other hand, software acceleration typically places too much of the processing burden on the host processor using compute cycles otherwise reserved for the host application and ultimately not achieving rendering performance typical to hardware graphics accelerators.

SUMMARY OF THE INVENTION

The present invention recognizes the disadvantages of the prior art and provides a fully programmable graphics processing engine. In one preferred embodiment, the graphics processing engine of the present invention includes three independent, programmable processors that run independent sets of instructions from independent instruction storage facilities. Graphics processing tasks may be distributed among the serially pipelined processors to allow for load balancing and parallel processing. The graphics processing engine may be a graphics co-processing core within a larger, general purpose computing system. Register files and storage units may be addressable by the system host processor. Each processor accepts incoming data for state or context updates. Each processor may execute a specific graphics processing function by executing a set of instructions when a pre-determined memory address is accessed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A-1 through 4C depict an example architecture for a rasterization arithmetic logic unit for a rasterization processor in accordance with a preferred embodiment of the present invention;

DETAILED DESCRIPTION OF THE PREFERRED EMBODIMENT

Figure 1:
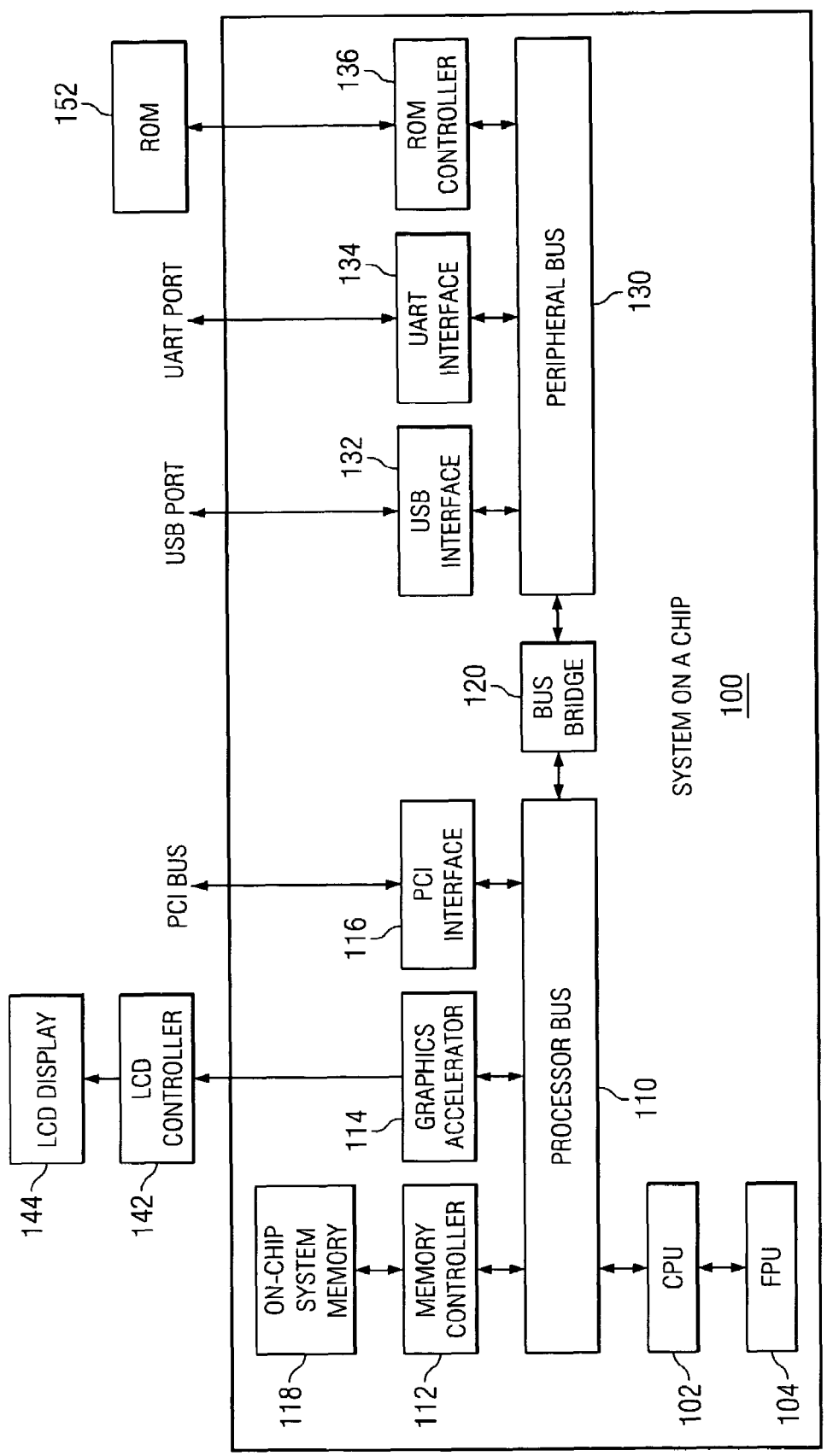
FIG. 1 is a pictorial representation of a data processing system in which the present invention may be implemented in accordance with a preferred embodiment of the present invention.

The present invention provides a programmable three-dimensional graphics engine. The three-dimensional graphics processing engine may be implemented in a stand-alone computing device to perform various aspects of the present invention. Therefore, the following FIG. 1 is provided as an exemplary diagram of a data processing environment in which the present invention may be implemented. It should be appreciated that FIG. 1 is only exemplary and is not intended to assert or imply any limitation with regard to the environment in which the present invention may be implemented. Many modifications to the depicted environment may be made without departing from the spirit and scope of the present invention.

With reference now to the figures and in particular with reference to FIG. 1, a pictorial representation of a data processing system in which the present invention may be implemented is depicted in accordance with a preferred embodiment of the present invention. The data processing system shown in FIG. 1 may include a system on chip (SoC) architecture in which the main components of the data processing system are embodied on a single chip, SoC 100. While a SoC architecture is shown in the depicted example, other data processing system architectures may be used within the scope of the present invention.

In the depicted example, the data processing system employs a bus architecture including processor bus 110 and peripheral bus 130 connected by bus bridge 120. Central processing unit 102, memory controller 112, graphics accelerator 114, and peripheral component interface (PCI) 116 are connected to processor bus 110. Floating point unit (FPU) 104 is connected to CPU 102. Memory controller 112 connects to on-chip system memory 118. Graphics accelerator 114 connects to liquid crystal display (LCD) controller 142, which may be embodied off the chip 100. LCD controller 142 provides control for LCD display 144. PCI interface 116 connects to a PCI bus off chip.

Universal serial bus (USB) interface 132, universal asynchronous receiver transmitter (UART) interface 134, and read-only memory (ROM) controller 136 are connected to peripheral bus 130. USB interface 132 connects to a USB port off chip. Similarly, UART interface 134 connects to a UART port off SoC 100. ROM controller 136 connects to ROM 152, which is off chip.

An operating system runs on processor 102 and is used to coordinate and provide control of various components within the data processing system in FIG. 1. The operating system may be a commercially available operating system such as Windows XP™, which is available from Microsoft Corporation, Linux™, or Palm OS®. An object oriented programming system, such as the Java™ programming system, may run in conjunction with the operating system and provides calls to the operating system from Java™ programs or applications executing on the data processing system. "JAVA" is a trademark of Sun Microsystems, Inc. Instructions for the operating system, the object-oriented programming system, and applications or programs are located on storage devices, such as ROM 152, and may be loaded into system memory 118 for execution by processor 102.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the present invention may be applied to a data processing system that is embodied as multiple components connected to a motherboard.

The depicted example in FIG. 1 and above-described examples are not meant to imply architectural limitations. For example, the data processing system may be a personal digital assistant (PDA), which is configured with flash memory to provide non-volatile memory for storing operating system files and/or user-generated data. In another example, the data processing system also may be a desktop computer, a tablet computer, laptop computer, or telephone device in addition to taking the form of a PDA. More specifically, the data processing system may be a cellular telephone, for example, and a digital signal processor (DSP) may be connected to processor bus 110.

In accordance with a preferred embodiment of the present invention, graphics accelerator 114 is a fully programmable 3-D graphics processing engine. Graphics accelerator 114 may include three independent, programmable processors, running independent programs from independent instruction storage utilities. Each processor may include register files and storage units that are addressable by system CPU 102. Each processor may accept incoming data consisting of state, context, and 3D data updates. A predetermined memory address may be defined for each graphics processing function for each processor. When a predetermined address is accessed, a processor may execute an associated set of instructions from local instruction storage. If an address does not refer to local register file and does not correspond to a an instruction in local instruction storage, the address and any associated data are passed to the next processor in the pipeline. Thus, the 3-D graphics processing engine of the present invention provides a level of flexibility while still allowing the graphics accelerator to perform specific graphics processing functions.

Figure 2A:
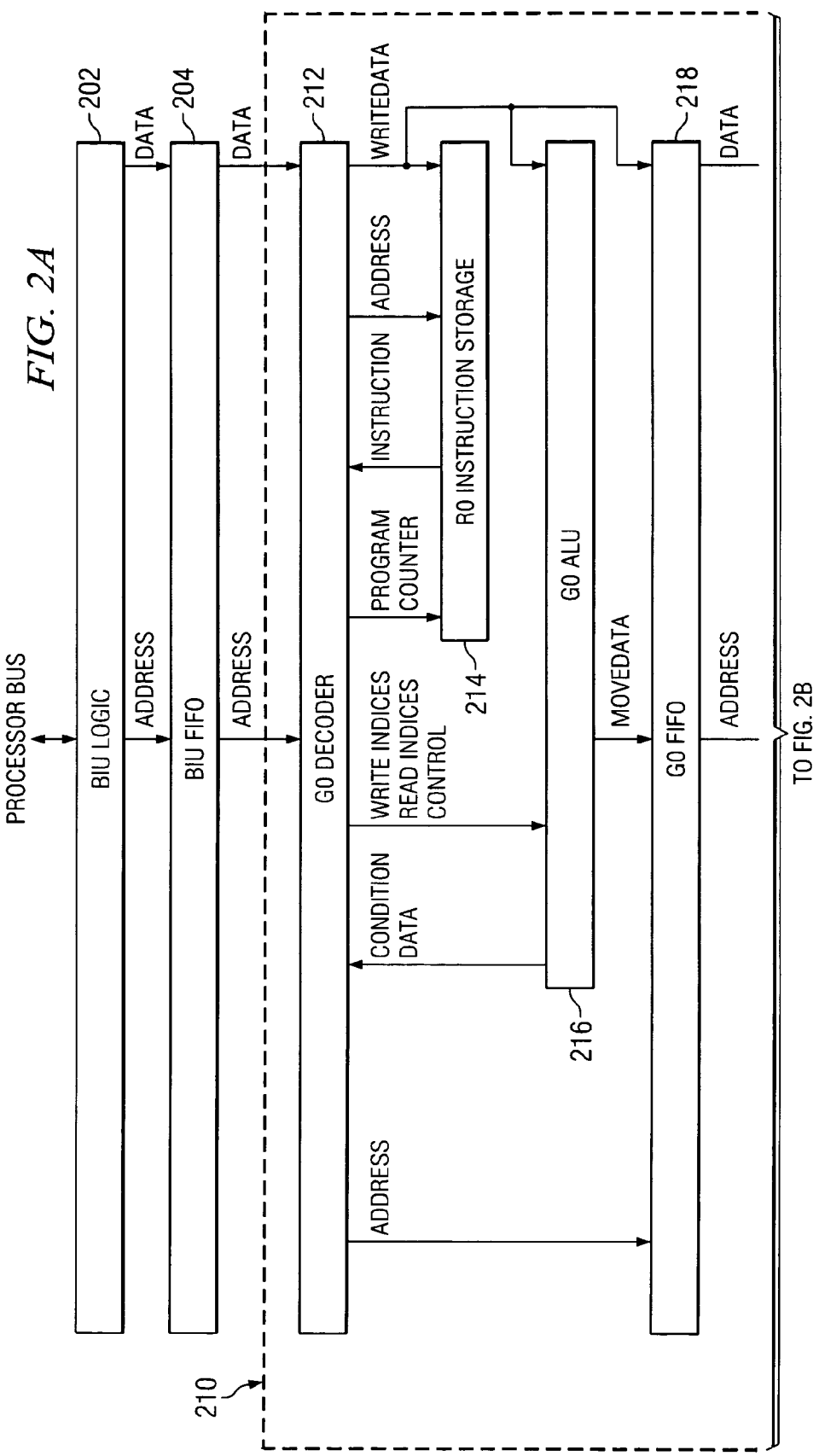
FIGS. 2A-2C depict a graphics core architecture in accordance with a preferred embodiment of the present invention.
Figure 2B:
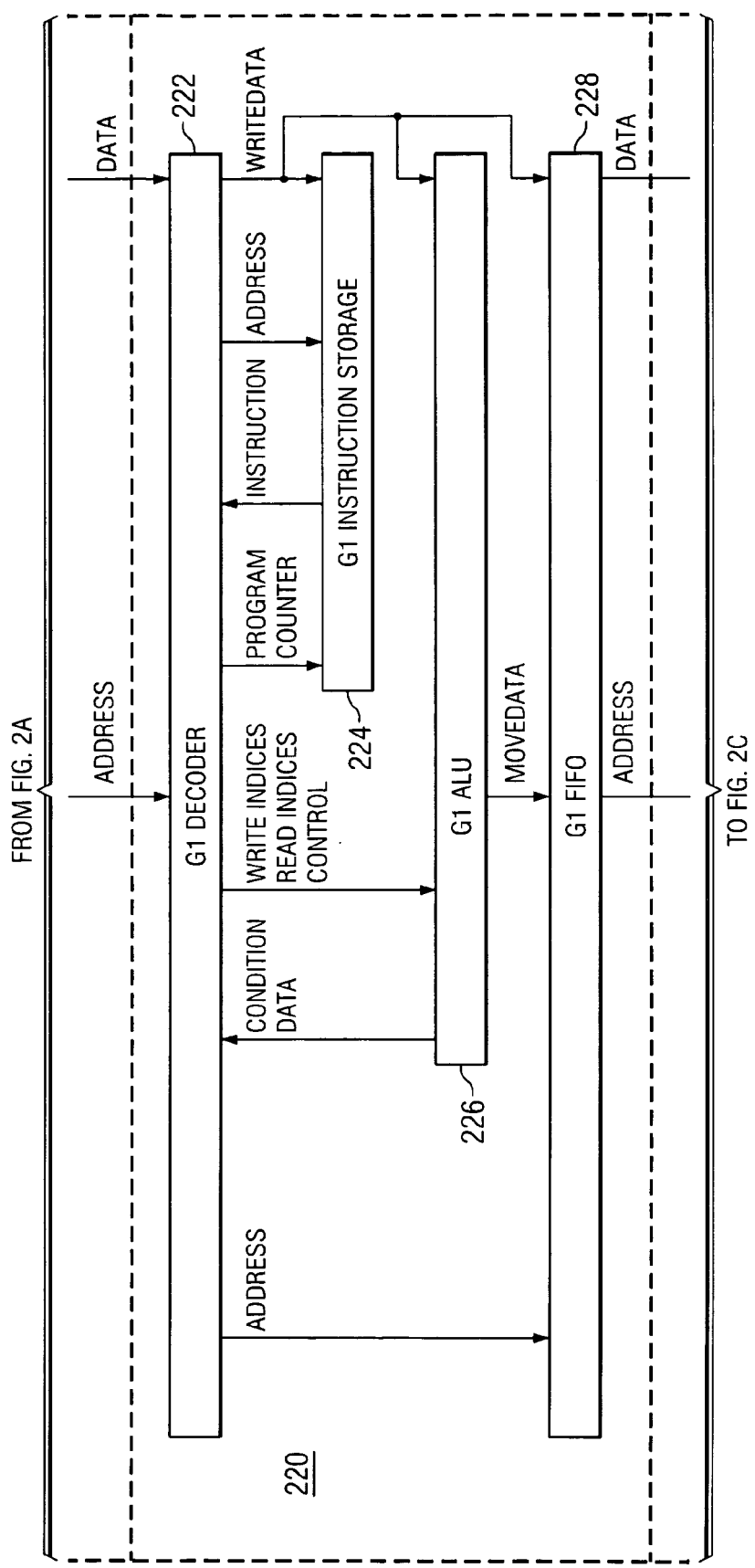
Figure 2C:
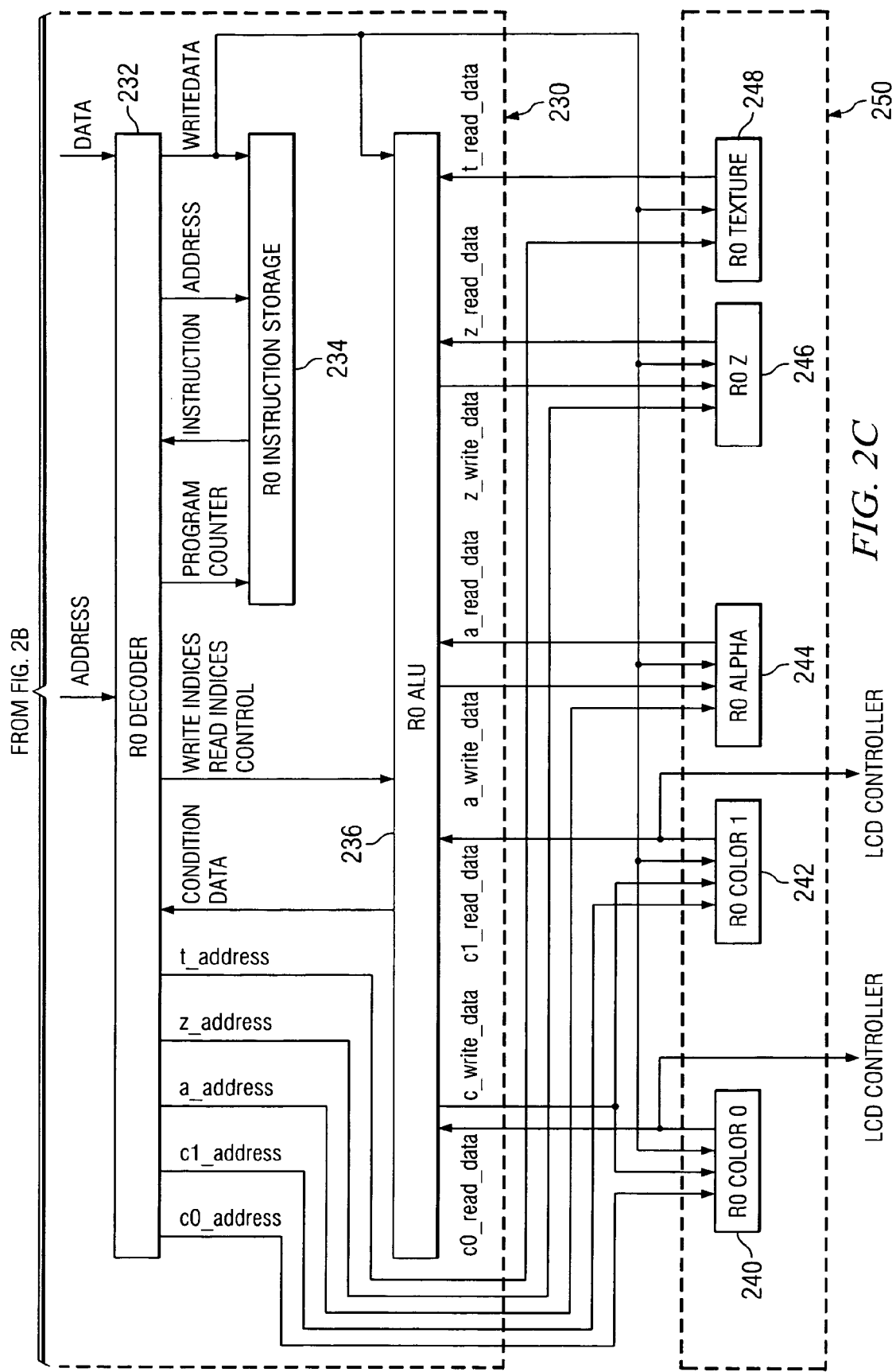

Referring to FIGS. 2A-2C, a graphics core architecture, such as graphics accelerator 114 in FIG. 1, is depicted in accordance with a preferred embodiment of the present invention. The graphics core architecture includes three independent, programmable processors that run independent sets of instructions from independent instruction storage facilities. First, with reference to FIG. 2A, bus interface unit (BIU) logic 202 connects to a processor bus, such as processor bus 110 in FIG. 1. BIU first-in/first-out (FIFO) buffer 204 stores data and addresses received from the processor bus.

A first geometry processor, G0 210, includes G0 decoder 212, G0 instruction storage 214, G0 arithmetic logic unit (ALU) 216, and G0 FIFO 218. Decoder 212 decodes addresses and determines whether a received address refers to local registers, storage, or instructions. Instruction storage 214 stores sets of instructions for graphics processing functions for the G0 geometry processor 210. Decoder 212 may pass a program counter, addresses, and write data to instruction storage 214. Decoder 212 may receive instructions from instruction storage 214 if an address from the system processor corresponds to a set of instructions for a graphics processing function in instruction storage 214.

ALU 216 performs arithmetic functions for geometric processor G0 210. Decoder 212 passes write indices, read indices, and control information to ALU 216. Decoder 212 also passes data to ALU 216 for processing. ALU 216 returns condition data to decoder 212 and sends data to G0 FIFO 218. In addition, decoder 212 may pass addresses and data to FIFO 218 so that addresses and data may be passed down the pipeline to other processors.

Turning to FIG. 2B, a second geometry processor, G1 220, includes G1 decoder 222, G1 instruction storage 224, G1 ALU 226, and G1 FIFO 228. Decoder 222 decodes addresses and determines whether a received address refers to local register file or local instruction store. Instruction storage 224 stores sets of instructions for graphics processing functions for the G1 geometry processor 220. Decoder 222 may pass a program counter, addresses, and write data to instruction storage 224. Decoder 222 may receive instructions from instruction storage 224 if an address from the system processor corresponds to a set of instructions for a graphics processing function in instruction storage 224.

ALU 226 performs arithmetic functions for geometric processor G1 220. Decoder 222 passes write indices, read indices, and control information to ALU 226. Decoder 222 also passes data to ALU 226 for processing. ALU 226 returns condition data to decoder 222 and sends data to G1 FIFO 228. In addition, decoder 222 may pass addresses and data to FIFO 228 so that addresses and data may be passed down the pipeline to another processor.

With reference now to FIG. 2C, a rasterization processor, R0 230, includes R0 decoder 232, R0 instruction storage 234, and R0 ALU 236. Decoder 232 decodes addresses and determines whether a received address refers to local register file or local instruction store. Instruction storage 234 stores sets of instructions for graphics processing functions for the R0 rasterization processor. Decoder 232 may pass a program counter, addresses, and write data to instruction storage 234. Decoder 232 may receive instructions from instruction storage 234 if an address from the system processor corresponds to a set of instructions for a graphics processing function in instruction storage 234.

ALU 236 performs arithmetic functions for rasterization processor R0. Decoder 232 passes write indices, read indices, and control information to ALU 236. Decoder 232 also passes data to ALU 236 for processing. ALU 236 returns condition data to decoder 232 and sends color write data, alpha write data, and Z write data to frame buffer 250, which will be described in further detail below. In addition, decoder 232 may pass addresses and data to frame buffer 250 to provide display information from any of the processors to a display controller (not shown).

Frame buffer 250 includes a first color storage buffer 240, a second color storage buffer 242, alpha storage buffer 244, Z storage buffer 246, and texture storage buffer 248. Buffers 240, 242 store pixel data for every pixel within the display area. While the pixels in R0 color 0 buffer 240, for example, are being rendered on the display, the graphics processor may begin processing pixels for the next frame of the display and store these pixels in R0 color 1 buffer 242. Then, when the next frame is rendered from buffer 242, the processor may begin processing pixels for the next frame of the display and store these pixels in buffer 240, and so on. Using two color storage buffers is not necessary, but provides a more consistent transition between frames, which ensures a smoother video image.

Alpha storage buffer 244 is used for transparency effects when blending an incoming pixel color with what is already present in the frame buffer. For example, an alpha value of 1.0 may indicate complete opacity, while a value of 0.0 may indicate complete transparency. A value in between may result in a blending of the two colors. Also, alpha values may be used in a test to mask out certain pixels while accepting others—a fragment-level filtering function. This may be accomplished with a mask of 1.0 and 0.0 values, although an arbitrary value may serve as a reference and then each incoming fragment's alpha may be compared to the reference to determine whether to accept or reject the fragment.

Z storage buffer 246 stores information for objects in a third dimension. That is, if the display space of a two-dimensional display device represents the X and Y dimensions, then the Z dimension is represented in Z storage buffer 246. An object or fragment may then be displayed in front of or behind another object based on the Z values stored in buffer 246. The Z coordinate generally represents the distance a vertex is from the viewer's position. Texture storage buffer 248 stores texels, which are elements of texture images that may be superimposed or modulated onto objects in the 3-D processor. For example, a wall may be represented on the display as a flat object or may have a texture, like stone, wallpaper, or brick. The texels that make up the texture are stored in buffer 248.

Geometric processors 210, 220 may be, for example, floating-point processors that include complex instructions, such as dot product and inverse square root. Rasterization processor 230 may be, for example, a fixed-point processor that includes complex instructions, such as a reciprocal function. In the context of low power graphics processing, rasterization processor 230 is preferably a fixed-point processor, due to constraints on chip size and power, as typically required by low power devices. However, all of processors 210, 220, 230 allow for the accuracy and computing power that is necessary for 3-D graphics processing.

Figure 3A:
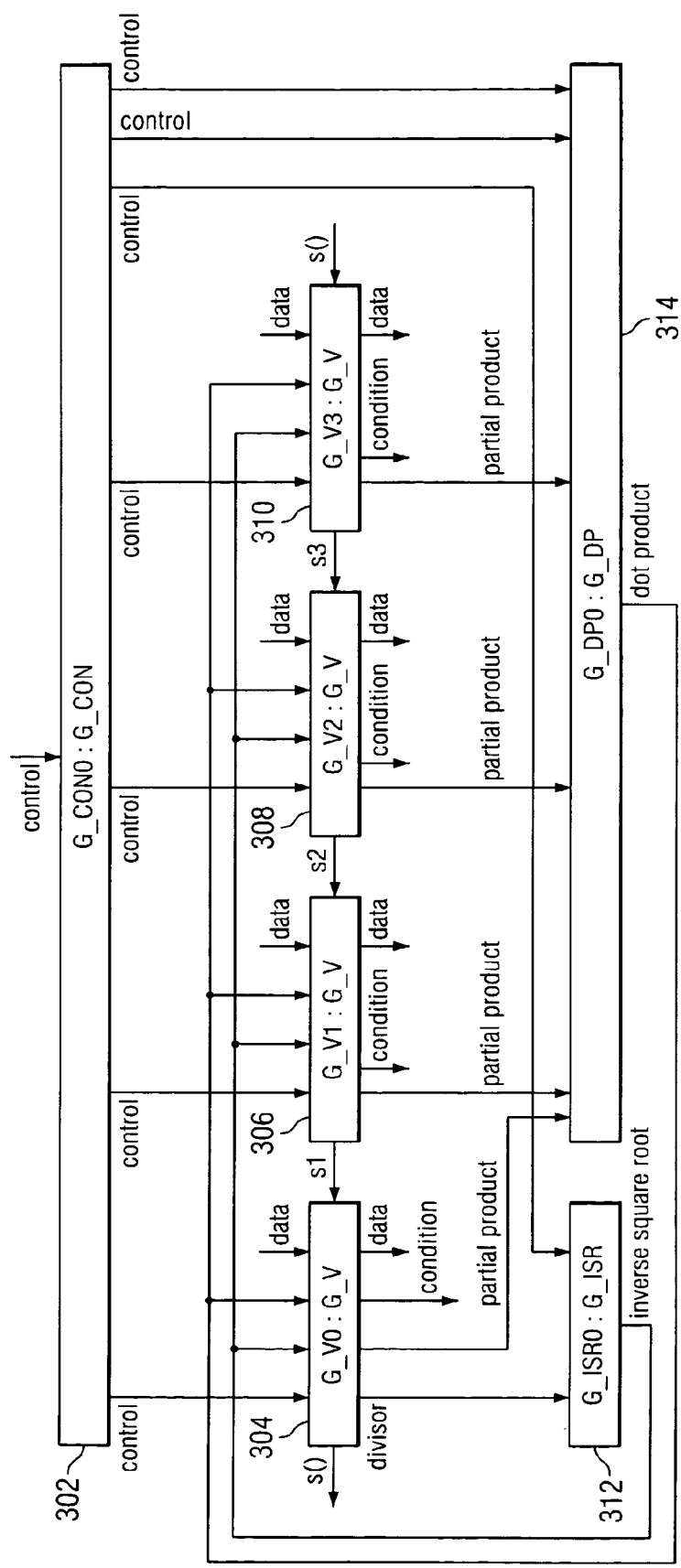
FIGS. 3A and 3B illustrate an example architecture for a geometric arithmetic logic unit for a geometric processor in accordance with a preferred embodiment of the present invention.
Figure 3B:
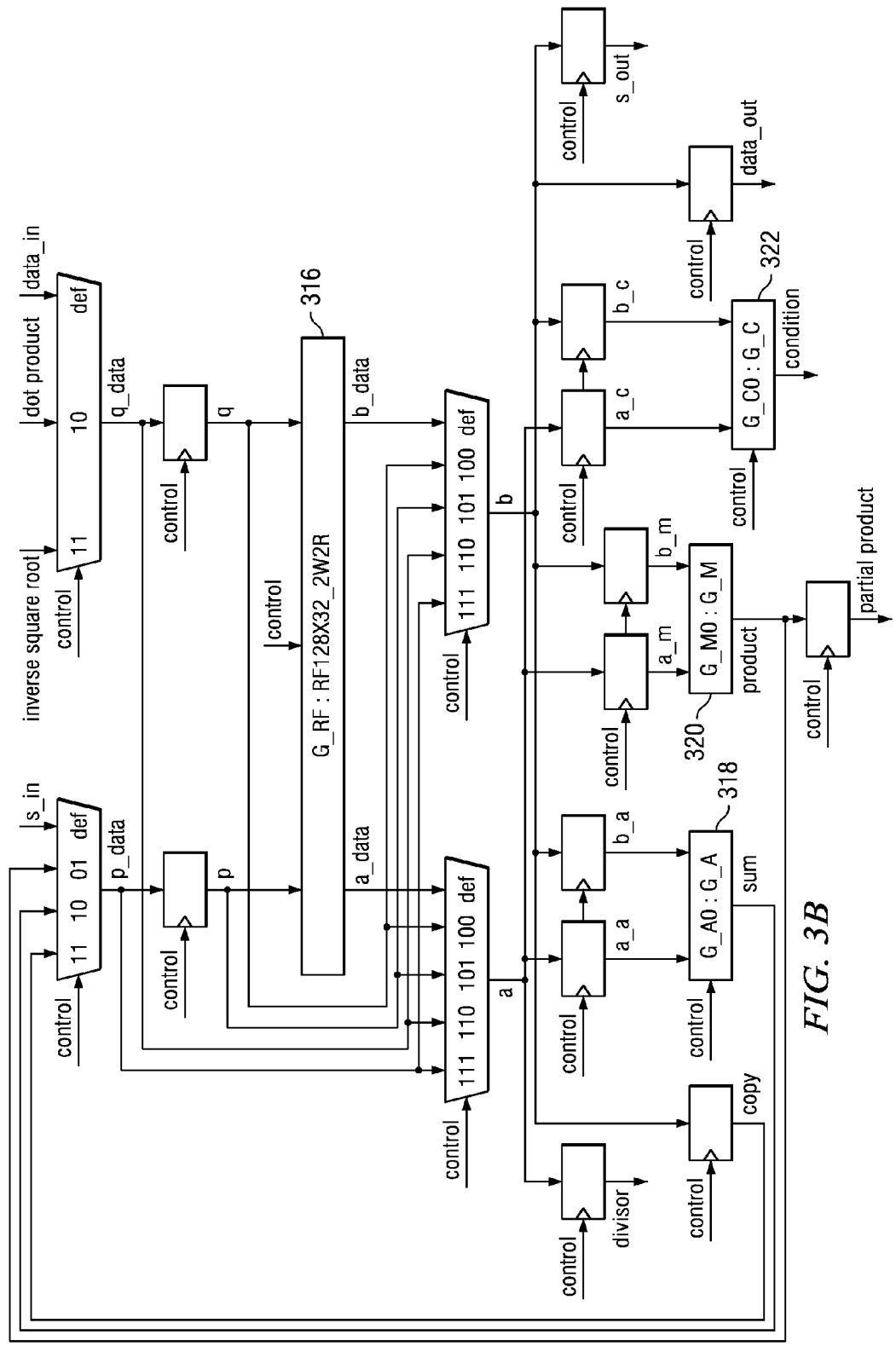

FIGS. 3A and 3B illustrate an example architecture for a geometric arithmetic logic unit for a geometric processor in accordance with a preferred embodiment of the present invention. More particularly, with reference to FIG. 3A, the geometric arithmetic logic unit (ALU) includes controller 302, data/arithmetic processing units 304-310, inverse square root unit 312, and dot product unit 314. As its name implies, inverse square root unit, G_ISR 312, is a specialized processing unit that performs an inverse square root function. Similarly, dot product unit, G_DP 314, is a specialized processing unit that performs a dot product on two vectors of data. Data/arithmetic processing units 304-310 perform basic arithmetic functions, such as addition, multiplication, and comparison.

Turning now to FIG. 3B, an example configuration for a data/arithmetic processor, such as one of processors 304-310, is shown. The data/arithmetic processor includes register file, G_RF 316, addition unit 318, multiplication unit 320, and compare unit 322. Addition unit 318 can perform addition and subtraction functions and multiplication unit 320 can perform multiplication functions. Compare unit 322 can perform comparison functions, such as greater than, less than, and equal to functions.

Figures 1, 4A:
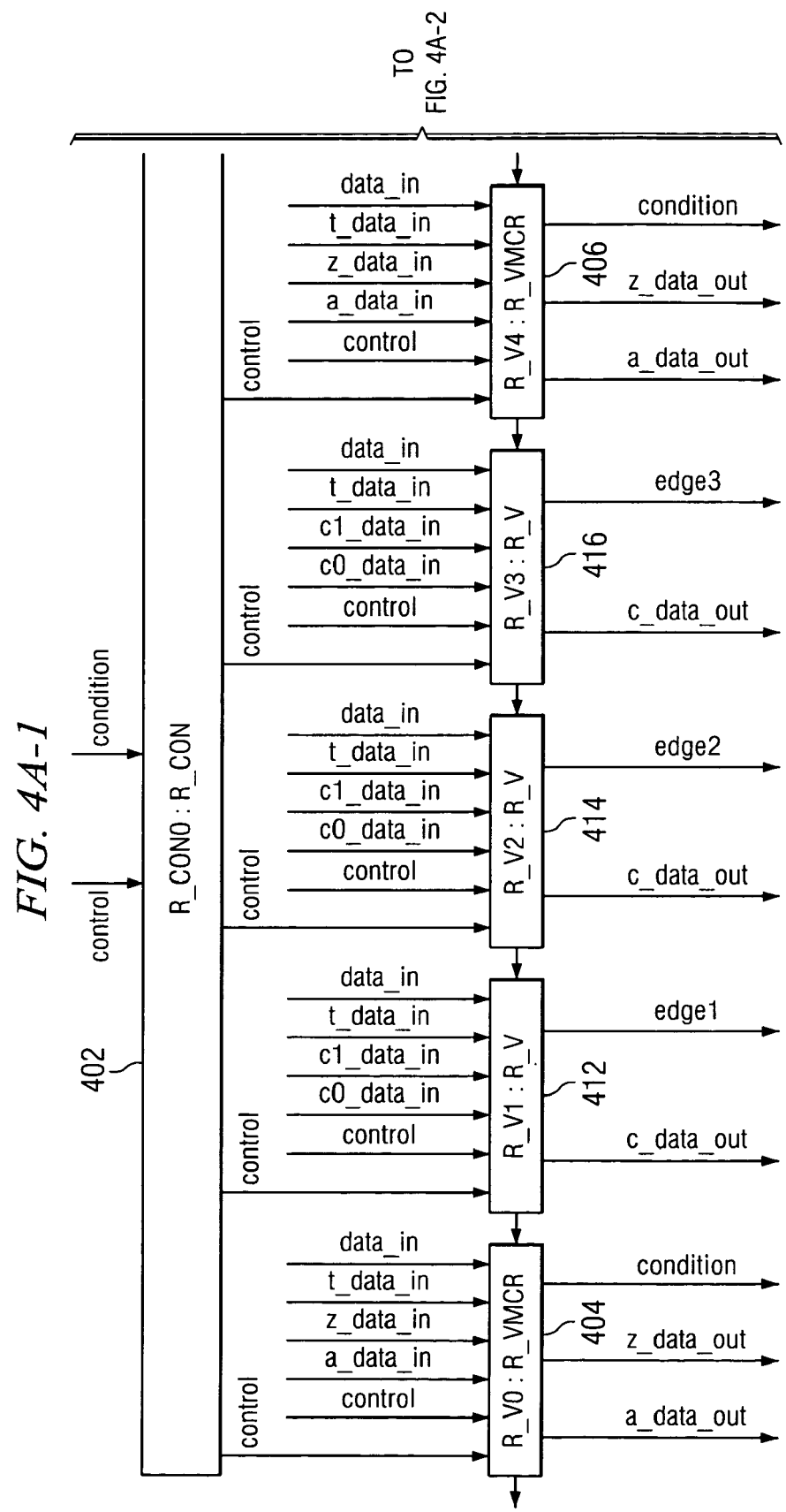
Figures 2, 4A:
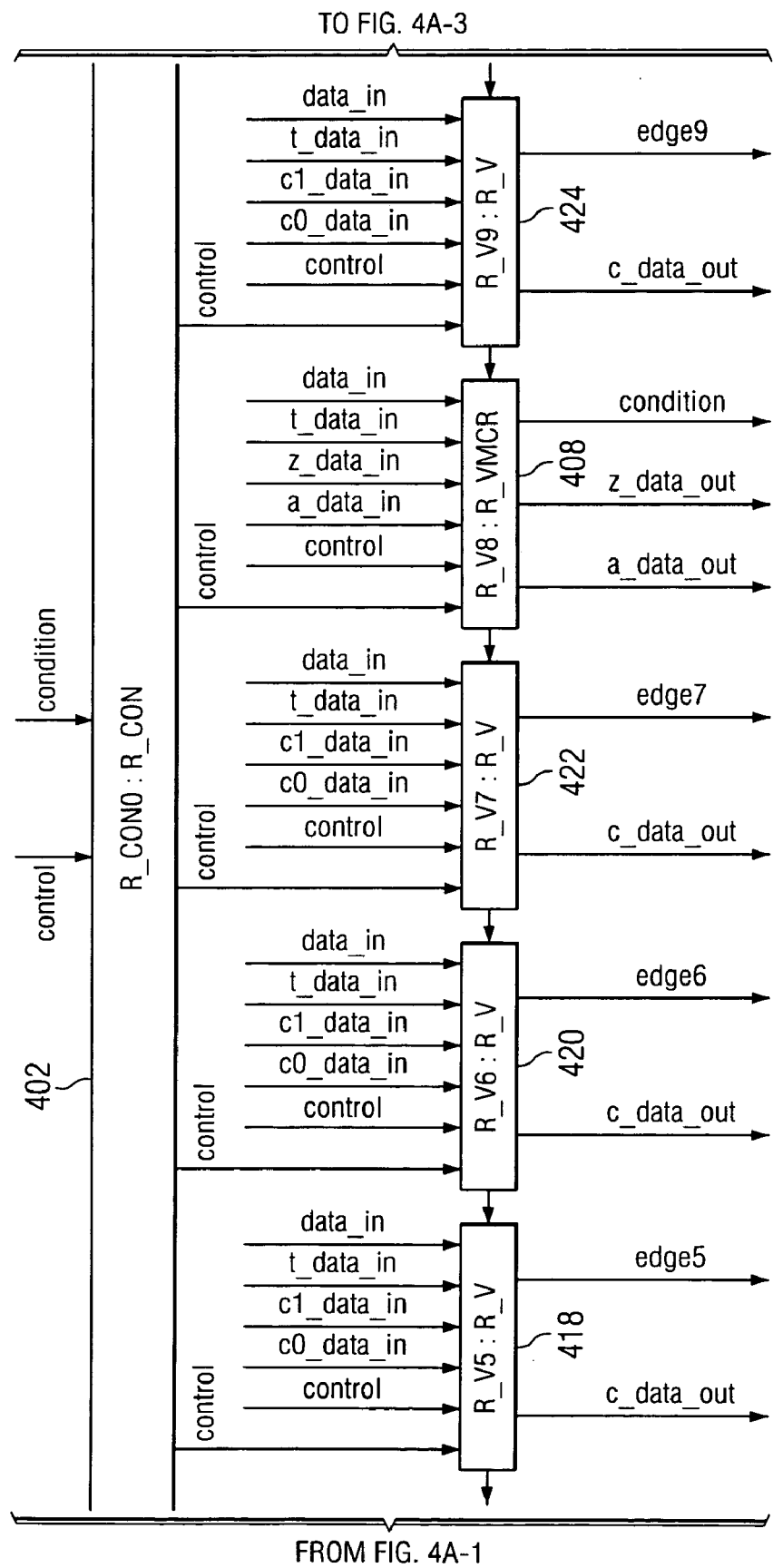
Figures 3, 4A:
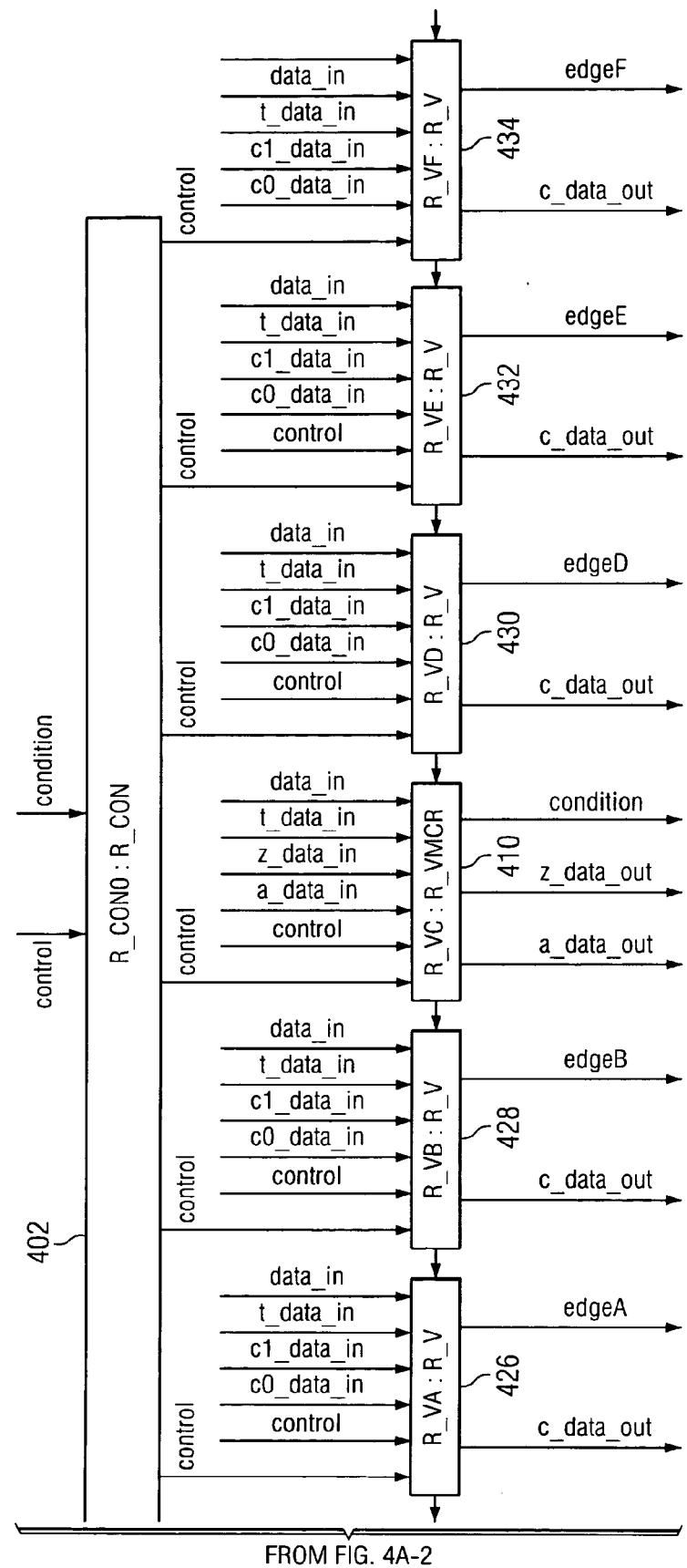
Figures 1, 4B:
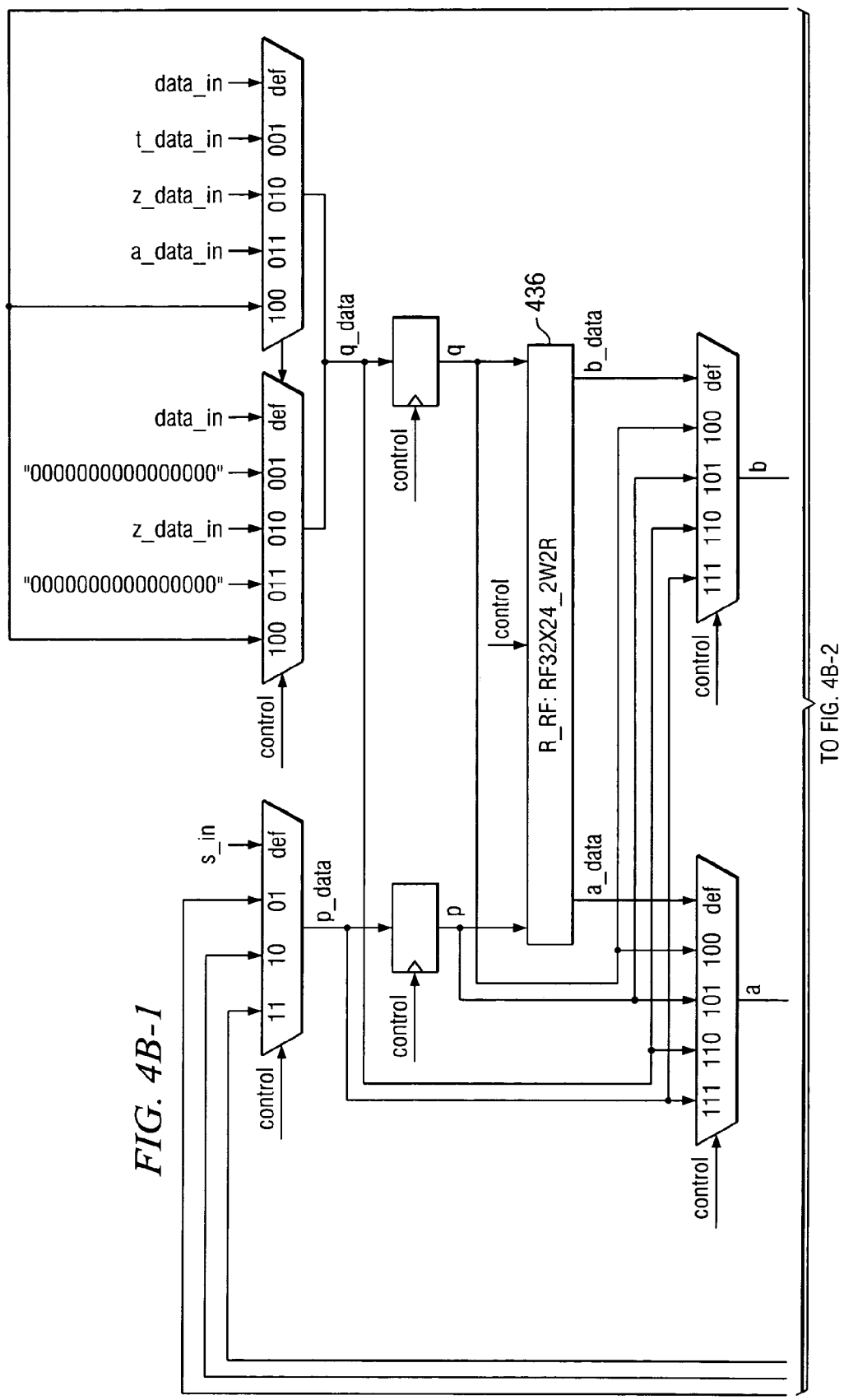
Figures 2, 4B:
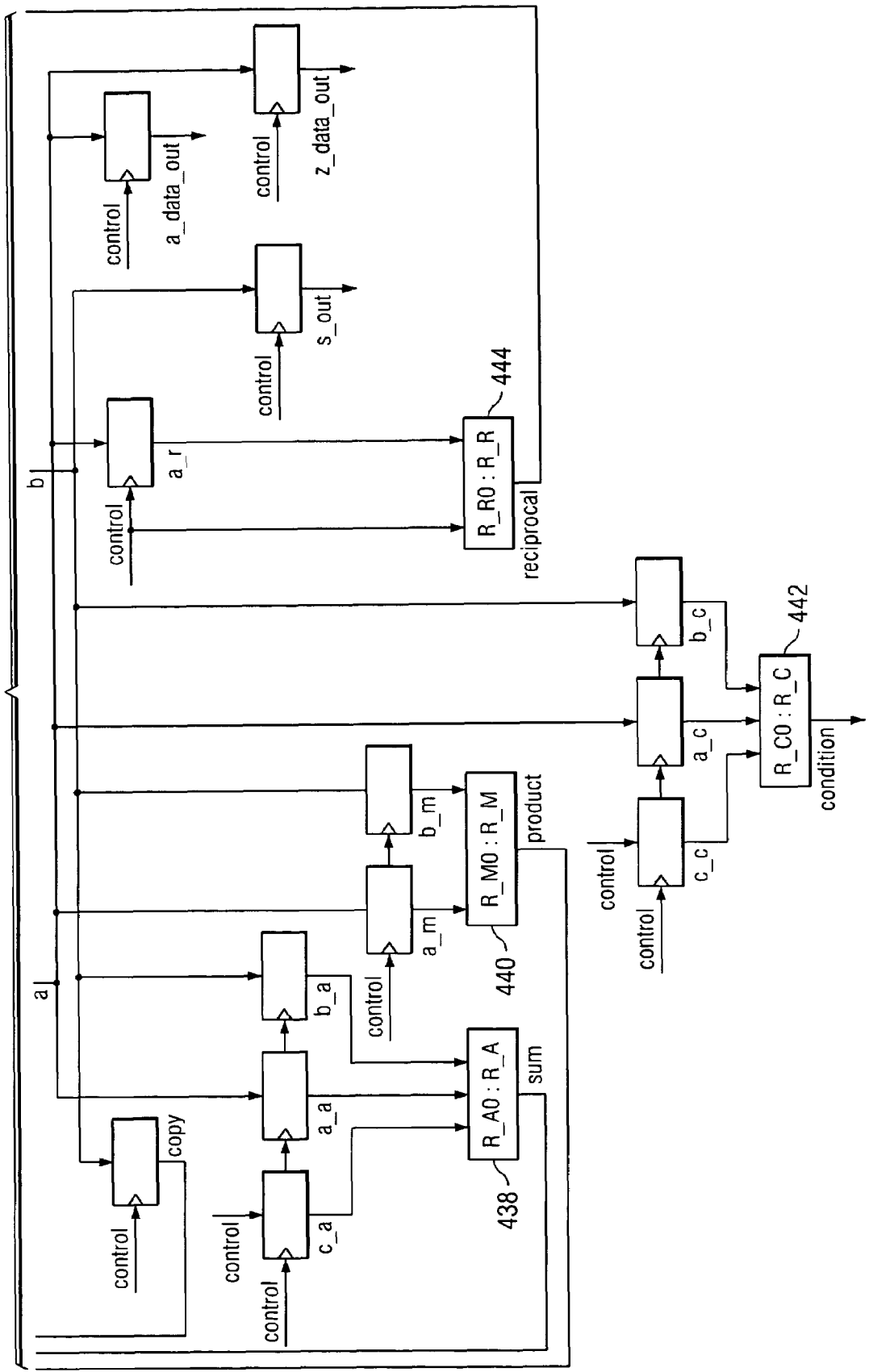
Figure 4C:
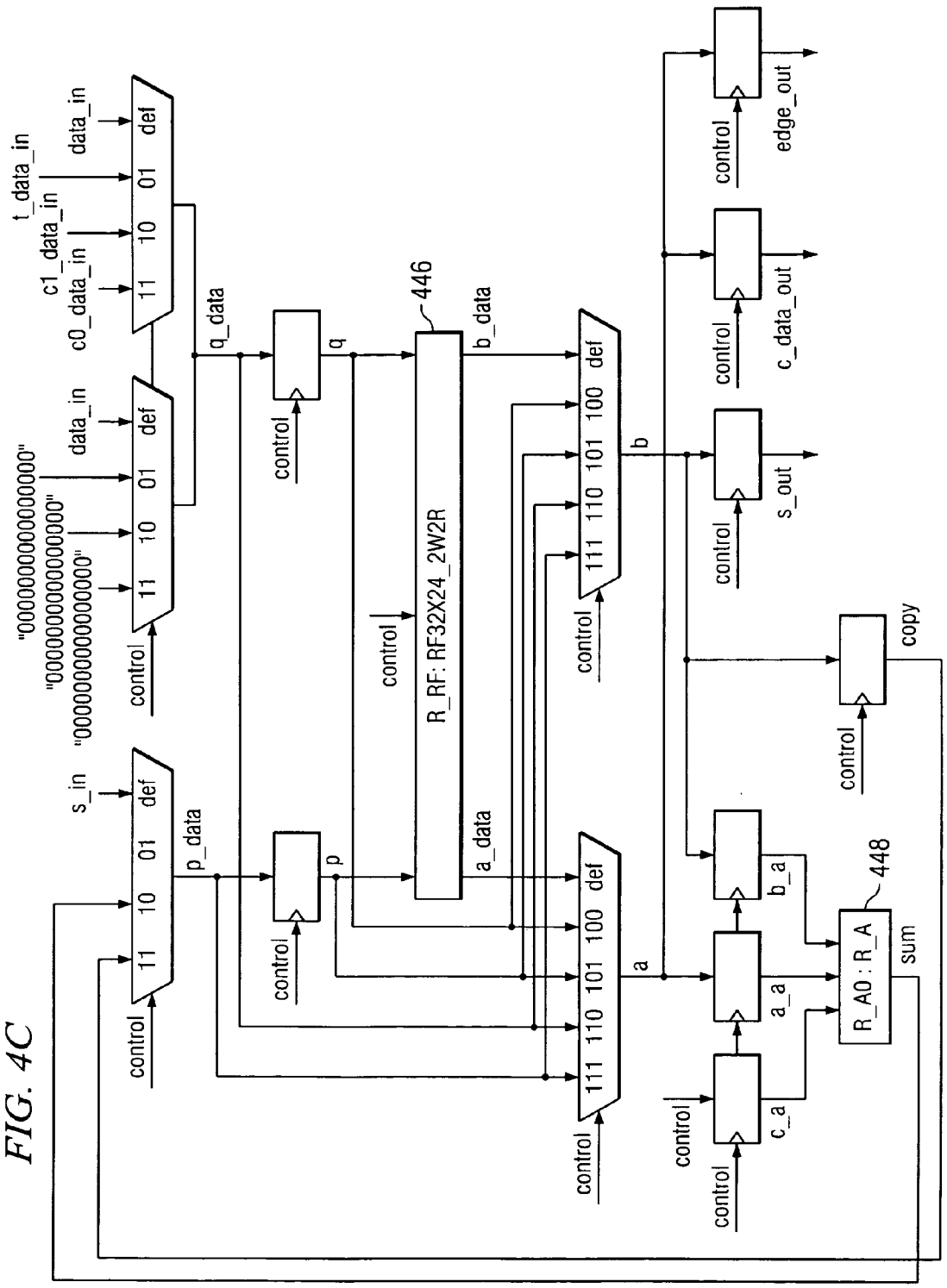

FIGS. 4A-1 through 4C depict an example architecture for a rasterization arithmetic logic unit for a rasterization processor in accordance with a preferred embodiment of the present invention. More particularly, with reference to FIGS. 4A-1 through 4A-3, the rasterization arithmetic logic unit (ALU) includes controller 402, data/arithmetic processing units 404-410, which perform multiplication, addition, subtraction, compare, and reciprocal functions, and data/arithmetic processing units 412-434, which perform addition/subtraction functions. Data/arithmetic processing units 404-434 perform basic arithmetic functions for the rasterization ALU.

Turning now to FIGS. 4B-1 and 4B-2, an example configuration for a data/arithmetic processor, such as one of processors 404-410, is shown. The data/arithmetic processor includes register file, R_RF 436, multiplication unit 438, addition unit 440, compare unit 442, and reciprocal unit 444. Addition unit 438 can perform addition and subtraction functions and multiplication unit 440 can perform multiplication functions. Compare unit 442 can perform comparison functions, such as greater than, less than, and equal to functions. Reciprocal unit 444 can perform a multiplicative inverse function that determines, for a value X, a number that, when multiplied by X, yields one.

With reference now to FIG. 4C, an example configuration for a data/arithmetic processor, such as one of processors 412-434, is shown. The data/arithmetic processor includes register file, R_RF 446, and addition unit 448. Addition unit 448 can perform addition and subtraction functions.

The examples shown in FIGS. 2, 3A, 3B, and 4A-4C are exemplary. Modifications may be made to the illustrated examples within the spirit and scope of the present invention. For example, in the depicted examples, the two geometry processors are floating-point processors, while the rasterization processor is a fixed-point processor. However, other combinations of processor types and architectures may be used. For example, the graphics processor may include three floating-point processors depending upon the implementation.

Figure 5:
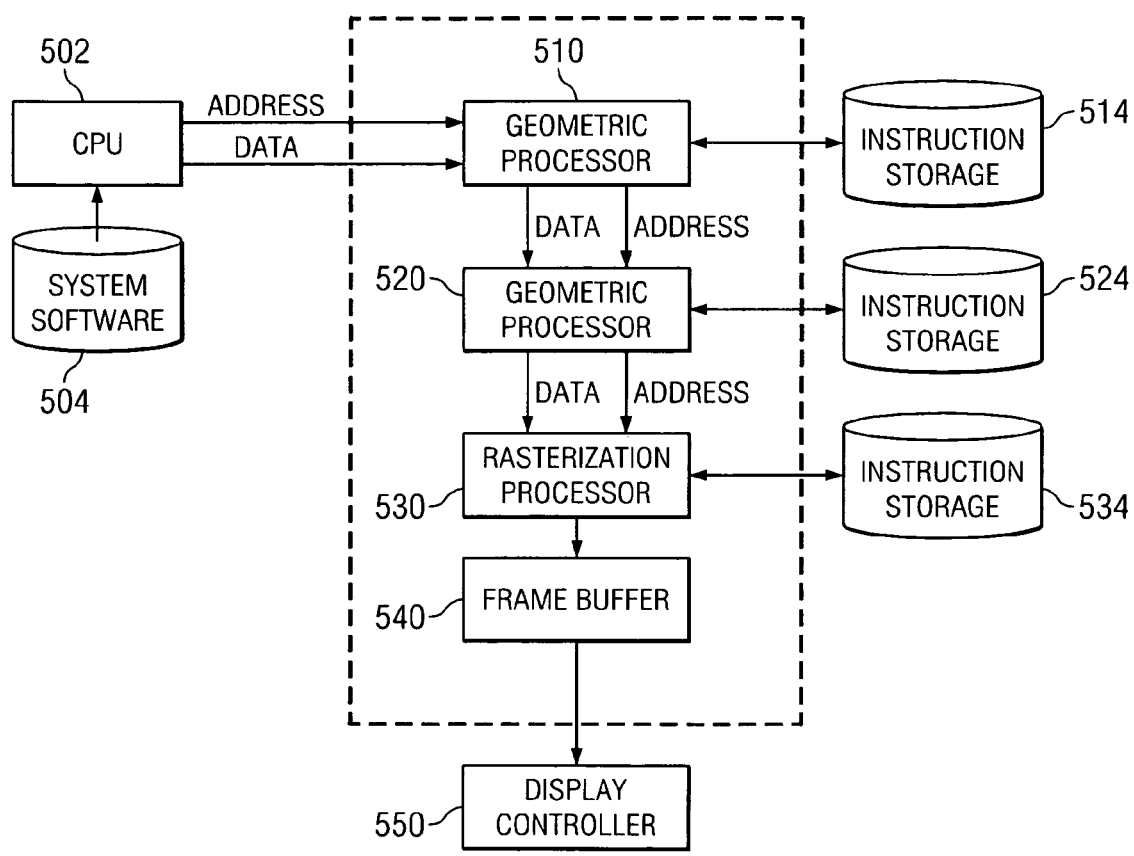
FIG. 5 is a block diagram illustrating the operation of a programmable three-dimensional graphics engine in accordance with a preferred embodiment of the present invention.

FIG. 5 is a block diagram illustrating the operation of a programmable three-dimensional graphics engine in accordance with a preferred embodiment of the present invention.

System processor, CPU 502, operates under control of system software 504. CU 502 may send addresses and data to geometric processor 510. CPU 502 may send data to update state or context data within the graphics processing engine. If the address references registers or local storage in geometric processor 510, then geometric processor 510 updates state or context data. However, if the address does not reference registers or local storage in geometric processor 510, then geometric processor passes the address and data to geometric processor 520.

Geometric processor 510 has instruction storage 514. At initialization, CPU 502, under control of system software 504, stores sets of instructions for graphics processing functions in instruction storage 514. Geometric processor 510 has one or more predetermined addresses that activates processing from instruction storage 514 such that a subsequent access to one of the predetermined addresses serves as an indicator for the processor to begin executing the graphics processing function, by executing the set of instructions from instruction storage 514. Upon completion of the graphics processing function, geometric processor 510 encounters a wait instruction from instruction storage 514, which indicates that the processor can begin processing graphics context and state updates from system processor 502.

Similarly, if the address references registers or local storage in geometric processor 520, then geometric processor 520 updates state or context data. Otherwise, if the address does not reference registers or local storage in geometric processor 520, then geometric processor passes the address and data to rasterization processor 530. In addition, geometric processor 520 has instruction storage 524 that may store sets of instructions for graphics processing functions in instruction storage 524. Geometric processor 520 has one or more predetermined addresses activates processing from instruction storage 524 such that a subsequent access to one of the predetermined addresses serves as an indicator for the processor to begin executing the graphics processing function, by executing the set of instructions from instruction storage 524.

Rasterization processor 530 may update state or context data in local registers and/or storage. In addition, rasterization processor 530 has instruction storage 534 that may store sets of instructions for graphics processing functions. Rasterization processor 530 has one or more predetermined addresses that activates processing from instruction storage 534 such that a subsequent access to one of the predetermined addresses serves as an indicator for the processor to begin executing the graphics processing function, by executing the set of instructions from instruction storage 534.

Rasterization processor 530 passes data to frame buffer 540 for presentation on a display, such as LCD 144 in FIG. 1. Display data may be passed through the pipeline from geometric processor 510 or geometric processor 520, or may be generated by rasterization processor 530. Display controller 550 reads display data for presentation from display buffer 540.

Figure 6:
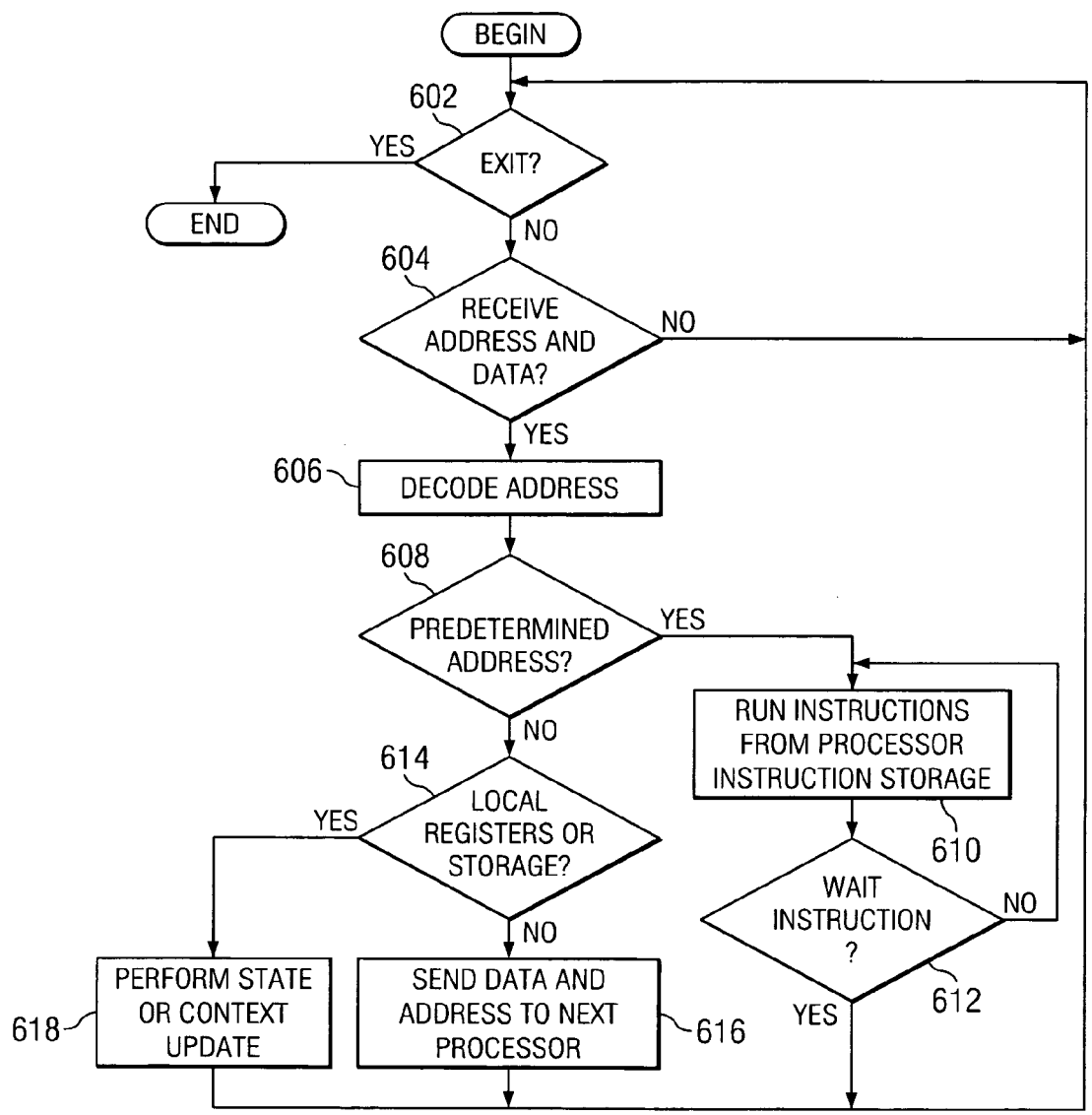
FIG. 6 is a flowchart illustrating the operation of a processor within a programmable three-dimensional graphics engine in accordance with an exemplary embodiment of the present invention.

FIG. 6 is a flowchart illustrating the operation of a processor within a programmable three-dimensional graphics engine in accordance with an exemplary embodiment of the present invention. Operation begins and a determination is made as to whether an exit condition exists (block 602). An exit condition may exist, for example, when the data processing system is shut down. If an exit condition exists, operation ends.

If an exit condition does not exist in block 602, a determination is made as to whether an address and data are received (block 604). If an address and data are received, the processor decodes the address (block 606) and a determination is made as to whether the address is a predetermined address corresponding to a set of instructions in local instruction storage (block 608). If the address is a predetermined address, the processor runs instructions from the processor instruction storage (block 610). Thereafter, a determination is made as to whether a wait instruction is encountered (block 612). If a wait instruction is not encountered, operation returns to block 610 to run instructions from the processor's local instruction storage; otherwise, operation returns to block 602 to determine whether an exit condition exists.

Returning to block 608, if the address is not a predetermined address, a determination is made as to whether the address references local registers or storage (block 614). If the address does not reference local registers or storage, the processor sends the data and address to the next processor in the pipeline (block 616). If the processor is the last processor in the pipeline, such as rasterization processor 530 in FIG. 5, the data is sent to the frame buffer. Then, operation returns to block 602 to determine whether an exit condition exists. If the address does reference local registers or storage in block 614, the processor performs a state or context update (block 618). Thereafter, operation returns to block 602 to determine whether an exit condition exists.

Thus, the present invention solves the disadvantages of the prior art by providing a fully programmable graphics processing engine. The three-dimensional graphics processing engine provides flexibility. The graphics processing engine also incorporates a frame buffer, which provides higher performance and lower power compared to an off-core frame buffer, which involves shared, higher loaded busses with more arbitration and latency. Additionally, the graphics processing engine also has complex instructions, such as dot product, inverse square root, and reciprocal, which can be used to accelerate particularly computationally intensive, frequently used operations in the geometry and pixel processing pipelines. In doing so, the processing engine is able to achieve some of the performance advantages of fixed-function hardware while retaining the programmability of general-purpose hardware. This approach allows for higher performance for its size and power consumption than a fixed-function solution would yield.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for performing graphics processing in a graphics processing engine, the computer implemented method comprising:

receiving an address in a first processor, wherein the first processor includes a first local instruction storage for the first processor;

decoding the address;

responsive to a determination that the address corresponds to a predetermined address for a set of instructions in the first local instruction storage of the first processor, executing the set of instructions in the first processor to perform a graphics processing function;

responsive to a determination that the address does not correspond to a predetermined address for a set of instructions in the first local instruction storage of the first processor, determining whether the address corresponds to a local register;

responsive to determining that the address corresponds to a local register, performing a state or context update; and responsive to determining that the address does not correspond to a local register, sending the address to a second processor in the pipeline.

2. The method of claim 1, further comprising:

responsive to a determination that the address does not correspond to a second predetermined address for a second set of instructions in a second local instruction storage of the second processor, sending data to a frame buffer.

3. The method of claim 1, further comprising:

prior to receiving the address, storing a set of instructions in the first local instruction storage.

4. An apparatus, in a graphics processing engine, for performing graphics processing, the apparatus comprising:

means for receiving an address in a first processor, wherein the first processor includes a first local instruction storage for the first processor;

means for decoding the address;

means for executing the set of instructions in the first processor to perform a graphics processing function in response to a determination that the address corresponds to a predetermined address for a set of instructions in the first local instruction storage of the first processor;

means for determining whether the address corresponds to a local register in response to a determination that the address does not correspond to a predetermined address for a set of instructions in the first local instruction storage of the first processor;

means for performing; a state or context update in response to a determination that the address corresponds to a local register; and means for sending the address to a second processor in the pipeline in response to a determination that the address does not correspond to a local register.

5. The apparatus of claim 4, wherein the first processor is a geometric processor.

6. The apparatus of claim 5, wherein the geometric processor is a floating-point processor.

7. The apparatus of claim 4, wherein the second processor is a geometric processor.

8. The apparatus of claim 7, wherein the geometric processor is a floating-point processor.

9. The apparatus of claim 4, wherein the second processor is a rasterization processor.

10. The apparatus of claim 9, wherein the rasterization processor is a fixed-point processor.

11. The apparatus of claim 4 further comprising:

means for sending data to a frame buffer responsive to a determination that the address does not correspond to a second predetermined address for a set of instructions in a second local instruction storage of the second processor.

12. The apparatus of claim 4, farther comprising:

means for storing a set of instructions in the first local instruction storage prior to receiving the address.

13. A programmable graphics processing engine, comprising:

a first geometric processor, wherein the first geometric processor includes a first local instruction storage for the first geometric processor, wherein the first geometric processor has a first predetermined address that corresponds to a first set of instructions in the first local instruction storage such that a subsequent access to the first predetermined address serves as an indicator for the first geometric processor to begin executing a graphics processing function by executing the first set of instructions from the first local instruction storage;

a second geometric processor, wherein the second geometric processor includes a second local instruction storage for the second geometric processor, wherein the second geometric processor has a second predetermined address that corresponds to a second set of instructions in the second local instruction storage such that a subsequent access to the second predetermined address serves as an indicator for the second geometric processor to begin executing a graphics processing function by executing the second set of instructions from the second local instruction storage;

a rasterization processor, wherein the rasterization processor includes a third local instruction storage for the rasterization processor, wherein the rasterization processor has a third predetermined address that corresponds to a third set of instructions in the third local instruction storage such that a subsequent access to the third predetermined address serves as an indicator for the rasterization processor to begin executing a graphics processing function by executing the third set of instructions from the third local instruction storage;

a frame buffer, wherein the frame buffer receives data from at least one of the first geometric processor, the second geometric processor, and the rasterization processor for presentation on a display;

responsive to a determination that an address does not correspond to the first predetermined address, sending the address to the second geometric processor;

responsive to a determination that the address does not correspond to a second predetermined address, sending the address to the rasterization processor; and responsive to a determination that the address does not correspond to a third predetermined address, sending data to a frame buffer.

14. The programmable graphics processing engine of claim 13, wherein at least one of the first geometric processor and the second geometric processor is a floating-point processor.

15. The programmable graphics processing engine of claim 14, wherein the floating-point processor includes a register file and a plurality of arithmetic processing units.

16. The programmable graphics processing engine of claim 15, wherein the plurality of arithmetic processing units includes at least one of an inverse square root unit and a dot product unit.

17. The programmable graphics processing engine of claim 13, wherein the rasterization processor is a fixed-point processor.

18. The programmable graphics processing engine of claim 17, wherein the fixed-point processor includes a register file and a plurality of arithmetic processing units.

19. The programmable graphics processing engine of claim 17, wherein the plurality of arithmetic processing units includes a reciprocal unit.

20. The programmable graphics processing engine of claim 13, wherein the frame buffer includes two color storage buffers.

21. The programmable graphics processing engine of claim 20, wherein the frame buffer further includes an alpha storage buffer, a Z storage buffer, and a texture storage buffer.

22. A programmable graphics processing engine on a system chip architecture, comprising:
a graphics accelerator connected to a processor bus;
wherein the graphics accelerator comprises:
a first geometric processor, wherein the first geometric processor includes a first local instruction storage for the first geometric processor, wherein the first geometric processor has a first predetermined address that corresponds to a first set of instructions in the first local instruction storage such that a subsequent access to the first predetermined address serves as an indicator for the first geometric processor to begin executing a graphics processing function by executing the first set of instructions from the first local instruction storage;
a second geometric processor, wherein the second geometric processor includes a second local instruction storage for the second geometric processor, wherein the second geometric processor has a second predetermined address that corresponds to a second set of instructions in the second local instruction storage such that a subsequent access to the second predetermined address serves as an indicator for the second geometric processor to begin executing a graphics processing function by executing the second set of instructions from the second local instruction storage;
a rasterization processor, wherein the rasterization processor includes a third local instruction storage for the rasterization processor, wherein the rasterization processor has a third predetermined address that corresponds to a third set of instructions in the third local instruction storage such that a subsequent access to the third predetermined address serves as an indicator for the rasterization processor to begin executing a graphics processing function by executing the third set of instructions from the third local instruction storage; and
a frame buffer, wherein the frame buffer receives data from at least one of the first geometric processor, the second geometric processor, and the rasterization processor for presentation on a display;
wherein the first geometric processor receives an address and data;
wherein the first geometric processor decodes the address to determine whether the address corresponds to the first predetermined address;
responsive to a determination that the address does correspond to the first predetermined address, accessing the first predetermined address to begin executing the first set of instructions from the first local instruction storage for the first geometric processor;
responsive to a determination that the address does not correspond to the first predetermined address, sending the address and data to the second geometric processor;
wherein the second geometric processor determines whether the address corresponds to the second predetermined address;
responsive to a determination that the address does correspond to the second predetermined address, accessing the second predetermined address to begin executing the second set of instructions from the second local instruction storage for the second geometric processor;
responsive to a determination that the address does not correspond to the second predetermined address, sending the address and data to the rasterization processor;
wherein the rasterization processor determines whether the address corresponds to the third predetermined address;
responsive to a determination that the address does correspond to the third predetermined address, accessing the third predetermined address to begin executing the third set of instructions from the third local instruction storage for the rasterization processor; and
responsive to a determination that the address does not correspond to the third predetermined address, sending the data to the frame buffer.

* * * * *